Sept. 6, 1949.  A. FISHKO  2,481,098
FLOOR BOX OR THE LIKE
Filed Feb. 19, 1944  2 Sheets-Sheet 1
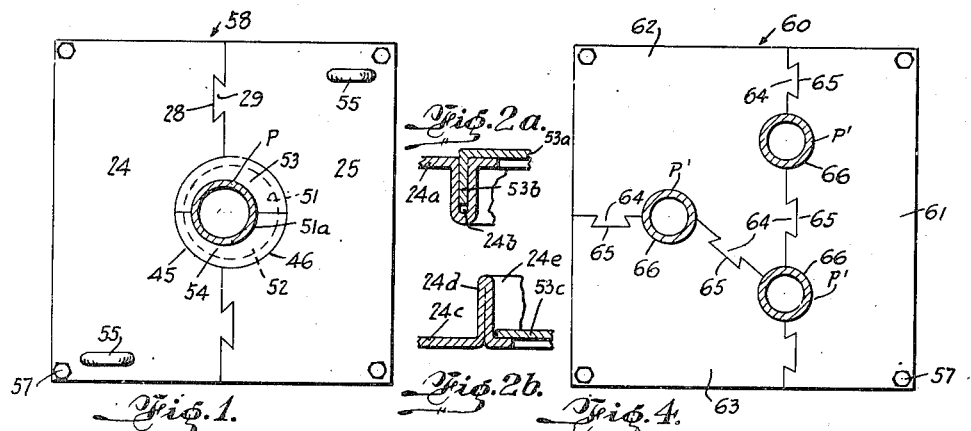
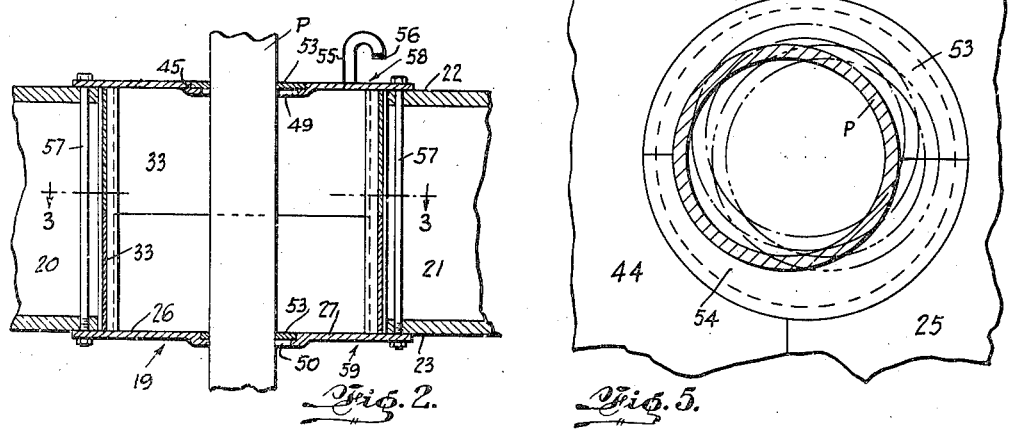
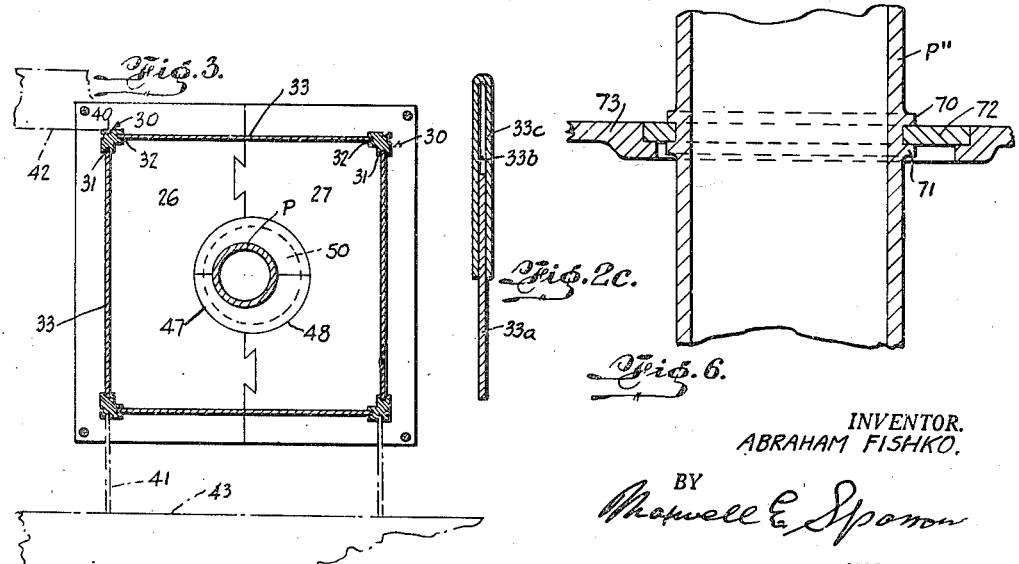
INVENTOR.
ABRAHAM FISHKO.
BY
ATTORNEY.

Sept. 6, 1949.    A. FISHKO    2,481,098
FLOOR BOX OR THE LIKE
Filed Feb. 19, 1944    2 Sheets-Sheet 2
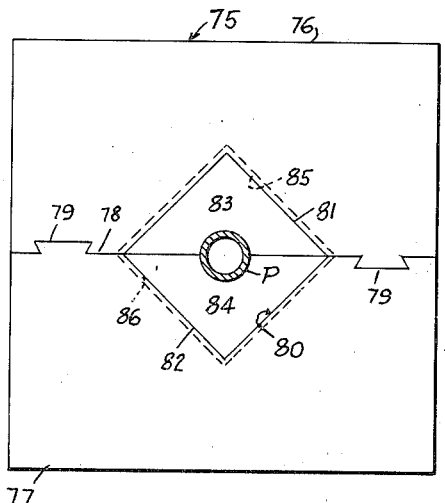
Fig. 7.
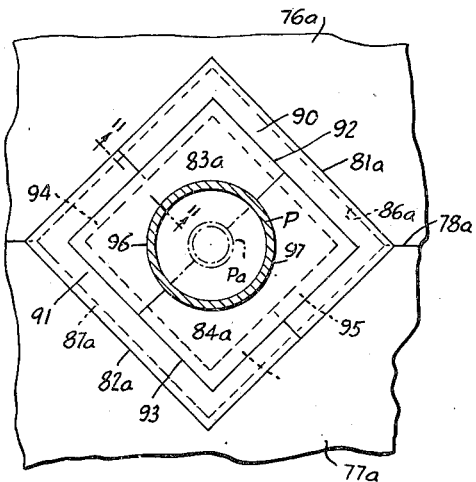
Fig. 10.
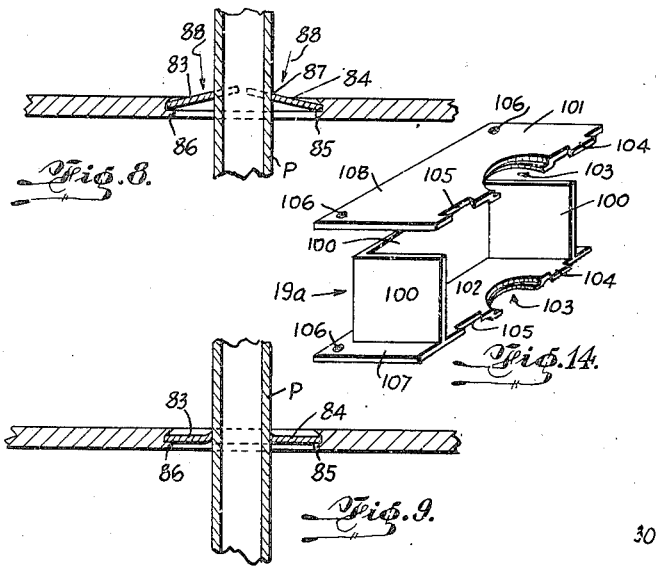
Fig. 8.
Fig. 14.
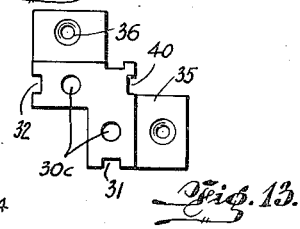
Fig. 13.
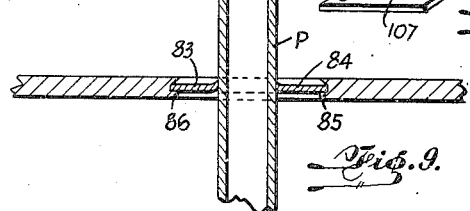
Fig. 9.
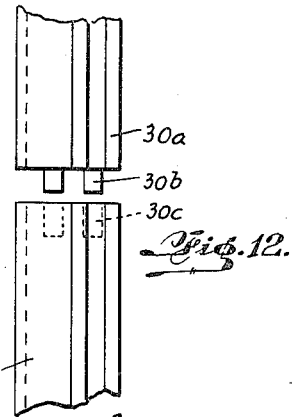
Fig. 12.
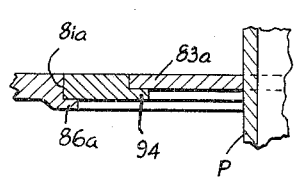
Fig. 11.
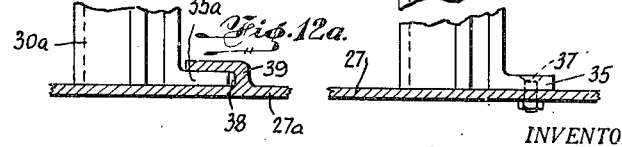
Fig. 12a.
INVENTOR.
ABRAHAM FISHKO.
BY
ATTORNEY.

Patented Sept. 6, 1949

2,481,098

UNITED STATES PATENT OFFICE 2,481,098

FLOOR BOX OR THE LIKE

Abraham Fishko, Brooklyn, N. Y.

Application February 19, 1944, Serial No. 523,069

3 Claims. (Cl. 126—317)

1

This invention relates to improvements in devices for preventing fire, smoke, air drafts, vermin and water drippings from passing from one section of a structure to another particularly along pipe lines and the like. This invention includes improved embodiments over the devices disclosed in my copending applications Serial Number 413,592, filed October 3, 1941, now Patent No. 2,343,896, March 14, 1944, and Serial Number 523,033, filed February 19, 1944, now abandoned.

It is an object of the present invention to provide a seal or cover for an opening in a structure through which a pipe line or the like passes, the seal comprising a plurality of parts which may be built up into a box like structure through which the pipe line may pass.

It is a still further object of the present invention to provide a covering around heating, water and other pipes passing from one floor to another of a structure, which will close that portion of the floor or ceiling through which such pipes pass, as well as prevent passage of foreign matter including vermin and water through the floors and ceilings of the structure, the covering including openings through which the pipes may pass and adjustable and removable sealing means for closing the said openings.

Yet another object of the present invention resides in providing the aforementioned box-like structure with means whereby the spaces between the openings in the said box-like structure and the external walls of the pipes may be closed or sealed.

It is yet another object of the present invention to provide a box-like structure comprising a plurality of parts adapted to be assembled on the job around existing pipes of a building construction, the said box-like structure when assembled fitting in the opening surrounding the pipes and extending from the upper lever of the arch or floor line of a building to the lower level of the arch or ceiling line thereof and in the space between beams of the building.

It is a still further object of the present invention to provide means whereby the walls of the aforesaid box-like structure may be assembled with facility.

Another object of the present invention is to provide a special type of pipe fitting in combination with the aforementioned box-like structure to enable the aforesaid members to be locked in position against the pipe fittings and yet permit movement thereof in accordance with slight lateral or longitudinal movements of the pipe fittings due to vibrations or expansion or contraction thereof.

These and other objects of the invention and the means for their attainment will be more apparent from the following detailed description, taken in connection with the accompanying drawings, illustrating certain embodiments in which the invention may be realized, and in which:

Fig. 1 is a top plan view of a structure embodying the invention in one of its forms (the pipe line passing through the structure being seen in section);

Fig. 2 is a longitudinal cross-sectional view thereof showing its application;

Fig. 3 is a transverse sectional view on line 3—3 of Fig. 2 of the device shown in Figures 1 and 2;

Fig. 4 is a top plan view of a structure embodying the invention in a modified form (the pipe lines being seen in section);

Fig. 5 is a diagrammatic view of a section of a structure embodying the invention, showing the portion surrounding the opening thereof receiving the pipe line, the latter being shown in section;

Fig. 6 is a sectional view showing a portion of a structure embodying the invention including a plate construction of pipe fitting cover and seal for closing the space between the opening in the cover and the pipe fitting;

Fig. 7 is a top plan view of a structure embodying the invention in a still further modified form, the pipe line being indicated in section;

Figs. 8 and 9 show in sections an application of a seal for closing the space in a pipe opening of a structure embodying the invention;

Fig. 10 is a top plan view showing sealing means for covering the space in the opening of a structure embodying the invention, from which opening the pipe line passes, the pipe line being shown in section;

Fig. 11 is a sectional view taken through line 11—11 of Figure 10;

Fig. 12 is a side view of portions of a post embodied in the invention;

Fig. 12a is a detailed view of a post-locking means employable in the invention;

Fig. 13 is a top plan view of one of the said post sections;

Fig. 14 is a perspective view showing one-half of a box-like structure (made in two parts) embodying the invention in a still further modified form;

Figs. 2a and 2b are sectional views of portions of additional sealing means for the pipe sealing members; and Fig. 2c is a sectional view taken through the side-wall members of a modified form of structure.

Referring now more particularly to the drawings there is disclosed in Figures 1–3, a box-like preferably rectangular structure 19 designed to close the opening between the joists or beams 20, 21 and between the upper level or floor line 22 and the lower level or ceiling line 23, of the arch in a building construction.

The box-like structure 19 may comprise a plurality of sectional top plates or wall elements 24, 25, and sectional bottom plates or wall elements 26, 27. These sectional plates may be respectively locked by means of dove-tail grooves 28 and tongues 29, although any other suitable means may be employed.

Secured to bottom plates 26, 27 by any suitable means are posts 30 having longitudinal grooves 31, 32 accommodating the side plates or walls 33. These post securing means may be, for example, those depicted in Figures 12 and 12a. In Fig. 12 the posts are provided with tongues 35 having holes 36 to receive bolts 37 securing the post to plate 27. In lieu of bolts 37, the post 30a (Fig. 12a) may be provided with lugs 35a fitting into a groove 38 formed in a bracket 39 which is part of bottom plate 27a. Additional grooves 40 may be provided in the posts 30 for accommodating auxiliary closing plates or walls 41 in cases where the beams 42, 43 are spaced further apart than the over-all dimensions of the box-like structure, these auxiliary plates abutting against a face of the beam 43.

The figures show the application of the invention to pipe lines P running in a vertical direction. Where the pipe line or other tubular member or obstruction to be embraced runs in a horizontal direction, the sides of the box-like structure would comprise sectional plates to fit around the pipe and the top and bottom would comprise unitary plates.

Where the pipe fittings are T's; L's; Y's; etc., it is understood that the desired sides of the box-like structure may comprise sectional plates to accommodate such pipe-fittings.

Each of the sectional plates 24, 25; and 26, 27 is provided with substantially semi-circular central cut-outs 45, 46; 47, 48, respectively, comprising openings 49, 50, through which the pipe line P passes.

The openings 49, 50 are made sufficiently large to accommodate various sized pipes so that there necessarily exists a space between the rims bounding openings 49, 50 and the external wall of the pipe P. These spaces must be closed for which purpose there are provided ledges 51, 52 on which rest locking plates 53, 54, respectively, these locking plates being adapted to completely seal such space. Plates 53, 54, have the close-fitting pipe opening 51a eccentrically located. Thus, by manipulating the plates 53, 54, as shown in Figure 5, the space surrounding the pipe not centrally located with respect to box 19, may be sealed.

Referring to Figs. 2a and 2b, means are provided for allowing for possible longitudinal displacement by expansion of pipe P. As the sectional locking plates 53, 54 (Figs. 1 and 2) are made to clamp tightly around pipe or conduit P, such plates 53, 54 will be displaced by such expansion of pipe P. Plate 53a in Fig. 2a is shown as having a downwardly projecting flange 53b sliding in a pocket 24b formed from cover plate 24a. As shown in Fig. 2b an upwardly extending flange 24d is formed from the cover plate 24c, thus providing a pocket 24e within which the plate 53c will move without causing an opening to be created.

As seen in Figure 2 the box-like structure 19 may be provided with conventional goose-neck or like ventilators 55, having their openings closed by screens 56.

The top wall 58 and the bottom wall 59 of the structure 19, constituted respectively of the sectional plates or wall elements 24, 25; 26, 27, are secured to the beams 20, 21 as by the clamping bolts and nuts 57, by which the entire structure 19 is secured in place after it has been assembled on the job. In lieu of the bolts and nuts 57, any other fastening means may be employed, such as, for example, screws having their heads flush with the top and bottom walls 58, 59, respectively.

As illustrated in Figure 4, the plate 60 may comprise a plurality of sectional members 61, 62, 63 adapted to accommodate a plurality of pipes P'.

Sections 61, 62, 63 are locked together by means of tongues 64 fitting into grooves 65. In this embodiment, complementary openings 66 are provided which snugly accommodate the pipes P', thus eliminating the use of additional closure plates. However, it is understood that these openings 66 may be made larger (for standardization purposes) in which case closure plates, such as those disclosed in Figures 1–3 may be employed.

As illustrated in Figure 6, the pipe fitting P'', or other obstruction to be embraced may be provided with spaced shoulders 70, 71, between which sectional closure plate 72 extends, thereby affording abutments for plate 72. It is understood, however, that only shoulder 71 may be used acting as a ledge or support upon which plate 72 is seated. It is readily seen that any movement of pipe fitting P'' resulting from vibration, contraction or expansion will be imparted to sectional plate 72 thus causing the latter to move therewith.

Closure plate 72 and cover plate 73 may be modified similarly to those shown in Figs. 2a, 2b, to accommodate such movement of plate 72 and thus provide a tight closure around pipe P''.

Fig. 2c shows a modified form of a side plate, somewhat similar to plate 33 of Fig. 2; however, in this instance, adjusting means are provided to permit adjustment in height of the walls without causing openings at joints between plates. These means are brought about by providing a U-shaped or channelled plate 33c, in the channel 33b of which is slidable the plate 33a.

Referring to Fig. 7, the cover plate 75 comprising the sections 76, 77 joined together at 78 and locked by tongue and groove joints as at 79, may be provided with a square opening 80, comprising the two triangular-shaped openings 81, 82, in the respective plates 76, 77. These triangular shaped openings 81, 82 are filled in by triangular sectional plates 83, 84, forming a tight closure around pipe P. These plates 83, 84 rest on depressed ledges 85, 86 extending from the sections 76, 77.

As shown in Figures 8 and 9, closure plates 83, 84, (Fig. 7) or 53, 54 (Fig. 1) may be made with the pipe opening 87 somewhat smaller than the diameter of the pipe in which case the triangular-shaped sections 83, 84, or the semi-circular sections 53, 54, will have to be forced down in the direction of arrows 88 to assume the sealing position shown in Fig. 9, in which the closure plates 83, 84 are illustrated as snugly engaging pipe P.

Fig. 10 discloses a modification of Fig. 7, wherein there are provided cover plates 76a, 77a, joined at 78a and having the triangular openings 81a, 82a, respectively. Depressed ledges 86a, 87a are provided to accommodate plates 90, 91, having openings 92, 93, with depressed ledges 94, 95.

Plates 83a, 84a rest on ledges 94, 95, and are provided with semi-circular openings 96, 97, accommodating the pipe P. The purpose of plates 83a, 84a is so that they may be interchangeable to thus accommodate various sizes of pipes P as indicated in broken lines Pa. It is understood that the plates 83a, 84a, fit in openings within plates 91, 92, large enough to accommodate the largest conventional pipe used.

Fig. 14 illustrates a modification in the box construction 19 shown in Figure 2. In this embodiment, the box-like structure is made in two halves, one of which is indicated by the numeral 19a, the companion half being an exact duplicate thereof. In this illustration the structure comprises sidewalls 100, separate top cover 101 and integral bottom 102.

Both top and bottom covers 101, 102 are provided with openings 103, to accommodate either the round closure plate construction shown in Figure 1 or the square closure plate constructions shown in Figures 7 and 10. Tongue and groove locking means 104, 105, respectively, are also provided to securely lock the two halves together when assembled. Bolt holes 106 in the flange 107 or extensions 108 of the cover plates 102, 101, respectively will facilitate the securing of the structure between beams as previously described.

In cases where the box-like structure shown in Fig. 2 is to be made higher than the posts 30 permit, it may be necessary to add extension sections 30a having pins 30b projecting within recesses 30c in post 30. With these adjusting means and with various heights of side wall members 33, or adjustable side wall members as shown in Figure 2c, any desired height of box may be provided for.

It is evident from Fig. 2 that the faces or walls of joists or beams 20, 21 may constitute two sides of the boxlike structure, in which case the corresponding side plates of structure 19 will be eliminated. It is further evident that in lieu of the two sectional side plates through which the pipe, pipe line or pipe fitting passes, one sectional plate may be employed for example, similar to the top plate comprising the sections 24, 25 shown in Fig. 1, in which case this sectional plate would be disposed between beams 20, 21 or side plates 33 and intermediate the floor and ceiling lines 22, 23, respectively; the sectional plates 24, 25, locking plates and pipe P constituting a partition to prevent drafts and the passage of foreign matter.

Although the invention has been described with relation to openings for pipes, it is understood that the same is applicable to an opening for any other element or elements wherein the opening surrounding the element is to be sealed or closed.

It is further understood that a casing or housing may be formed by adjacent box-like structures and side panels joining these structures.

As many possible embodiments may be made of the above invention, and as many changes might be made in the embodiments above set forth, it is to be understood that all matter hereinbefore set forth or shown in the accompanying drawings is to be interpreted as illustrative and not in a limiting sense.

Having thus described my invention, what I claim as new, and desire to be secured by Letters Patent, is:

1. In a building construction, the combination, with an elongated member passing with clearance through an opening in said construction, of a box-like structure substantially filling said opening, said structure having a pair of spaced parallel walls, each of said walls comprising a plurality of contiguous sections spanning a substantial part of said opening and having complementary cutouts which together form a hole through which said member passes so as to be on all sides spaced from the periphery of said hole, and an insert filling the space of said hole between its periphery and said member, said insert consisting of at least two complementary portions engaging said member, said walls being spaced by a plurality of posts extending substantially parallel to said member, said posts being provided with longitudinal grooves, said structure further having a plurality of side walls each held in the grooves of two of said posts.

2. The combination according to claim 1 wherein each of said posts consists of a plurality of endwise abutting post elements fitted together, said elements being formed with aligned grooves to receive said side walls.

3. In a building construction, in combination with a plurality of elongated members passing with clearance through an opening in said construction, a box-like structure disposed in said opening, said structure comprising a pair of spaced parallel walls, each of said walls comprising a plurality of contiguous sections spanning a substantial part of said opening and having a plurality of complementary cutouts, the cutouts of each of said complementary cutouts together forming a hole through which one of said members passes so as to be on all sides spaced from the periphery of said hole, an insert filling the space of said hole between its periphery and the member passing therethrough, said insert consisting of at least two complementary portions engaging said member, said structure further comprising a plurality of posts extending substantially parallel to said members, each of said posts being formed with a plurality of longitudinal grooves, and a plurality of side walls each held in the grooves of two of said posts.

ABRAHAM FISHKO.

REFERENCES CITED

The following references are of record in the file of this patent:

UNITED STATES PATENTS

| Number | Name | Date |
|--------|------|------|
| 24,387 | Greenleaf | June 14, 1859 |

(Other references on following page)

UNITED STATES PATENTS

| Number | Name | Date |
|---|---|---|
| 34,743 | Davis | Mar. 25, 1862 |
| 74,444 | Stover | Feb. 11, 1868 |
| 142,784 | Fulton | Sept. 16, 1873 |
| 161,442 | Rogers | Mar. 30, 1875 |
| 249,308 | Clawson | Nov. 8, 1881 |
| 317,684 | Stilson | May 12, 1885 |
| 361,767 | Lilliendahl | Apr. 26, 1887 |
| 367,885 | Anderson | Aug. 9, 1887 |
| 393,121 | Packham | Nov. 20, 1888 |
| 412,673 | Shaffer | Oct. 8, 1889 |
| 423,439 | Newman et al. | Mar. 18, 1890 |
| 470,845 | Carll | Mar. 15, 1892 |
| 473,751 | Howe | Apr. 26, 1892 |
| 539,119 | Collis | May 14, 1895 |
| 576,899 | Scott | Feb. 9, 1897 |
| 605,640 | Houghton et al. | June 14, 1898 |
| 608,060 | Mallen | July 26, 1898 |
| 716,954 | Stilson | Dec. 30, 1902 |
| 814,976 | Mehring | Mar. 13, 1906 |
| 1,321,676 | Shurtleff | Nov. 11, 1919 |
| 1,539,371 | Scott et al. | May 26, 1925 |
| 1,562,082 | Drinkwater | Nov. 17, 1925 |
| 1,678,388 | Holden | July 24, 1928 |
| 1,757,664 | Gohman | May 6, 1930 |
| 1,778,932 | Blankenberg | Oct. 21, 1930 |
| 1,781,849 | Kiesel | Nov. 18, 1930 |
| 1,821,295 | Dieter | Sept. 1, 1931 |